United States Patent [19]
Kaji

[11] Patent Number: 5,623,709
[45] Date of Patent: Apr. 22, 1997

[54] TRIPOD WITH DETECTOR FOR INCLINATION OF PAN HEAD

[75] Inventor: Hidenobu Kaji, Kawasaki, Japan

[73] Assignee: Nikon Corporation, Tokyo, Japan

[21] Appl. No.: 598,649

[22] Filed: Feb. 8, 1996

[30] Foreign Application Priority Data

Feb. 10, 1995 [JP] Japan ................................ 7-022821

[51] Int. Cl.$^6$ ................................................. G03B 29/00
[52] U.S. Cl. ...................... 396/283; 396/296; 396/428; 352/171; 352/243; 248/542
[58] Field of Search ........................... 354/81, 82, 289.1, 354/293; 352/170, 171, 243; 248/176.1, 177.1, 187.1, 542, 543

[56] References Cited

U.S. PATENT DOCUMENTS 5,170,197  12/1992  Schmidt et al. ..................... 354/81

Primary Examiner—Howard B. Blankenship

[57] ABSTRACT

A tripod device for holding a camera in a predetermined position has an angle detector for detecting an inclination of a pan head disposed on the tripod device, an angle setting unit for setting a working angle of the pan head, a control unit for outputting a set signal when an angle of the pan head detected by the angle detector becomes the set working angle and a notifying unit to be operated by the set signal from the control unit for notifying a user that the pan head of the tripod device is set at the working angle.

6 Claims, 5 Drawing Sheets

TRIPOD WITH DETECTOR FOR INCLINATION OF PAN HEAD

BACKGROUND OF THE INVENTION

1. Field of the Invention

The present invention relates to a tripod device for holding a camera or the like in a predetermined position.

2. Related Background Art

Generally, in photographing with a camera, a tripod device is utilized as a photographing auxiliary equipment for stabilizing the camera and preventing camera shake.

Conventionally, in such a tripod device, while looking through a finder of the camera, three legs of the tripod device are operated to determine the angle of its pan head with respect to its supporting surface.

Also, a level is provided on a tripod device, and while looking at the level, three legs of the tripod device are operated to determine the angle of its pan head with respect to its supporting surface.

However, in the method wherein while looking through the finder of the camera, the three legs are operated to determine the angle of the pan head with respect to the supporting surface, after the camera is mounted to the pan head of the tripod device, the angle of the pan head is adjusted while looking through the finder. Therefore, it takes a lot of trouble and time to set the tripod device.

Further, in the method wherein while looking at the level, the three legs of the tripod device are operated to determine the angle of the pan head with respect to the supporting surface, it is necessary to ascertain the horizontality of the level with eyes. Therefore, it takes a lot of trouble and time to set the tripod device, the same as above.

SUMMARY OF THE INVENTION

It is an object of the present invention to provide a tripod device capable of solving the above problems and setting a pan head at a predetermined angle easily and surely.

It is another object of the present invention to provide a tripod device capable of setting a working angle of a pan head desired by a user and setting the pan head at the working angle easily and surely.

In order to achieve the above objects, a tripod device of the present invention has an angle detector for detecting an inclination of a pan head disposed on the tripod device; an angle setting unit for setting a working angle of the pan head; a control unit for outputting a set signal when an angle of the pan head detected by the angle detector becomes the working angle set by the angle setting unit; and a notifying unit to be operated by the set signal from the control unit for notifying a user that the pan head of the tripod device is set at the working angle.

It is another object of the present invention to provide a tripod device capable of setting a pan head at a predetermined angle easily and surely, since the fact that the inclination of the pan head of the tripod device becomes a predetermined angle is notified to a user. For this object, a tripod device has an angle detector for detecting, when a pan head disposed on the tripod device is inclined at a predetermined angle, the predetermined angle, and outputting a predetermined angle signal; and a notifying unit to be operated by the predetermined angle signal from the angle detector for notifying a user that the pan head is inclined at the predetermined angle.

It is still another object of the present invention to provide a tripod device capable of setting a pan head easily and surely depending on sound, as the fact that the pan head is set at a predetermined angle is notified to a user by the sound. A tripod device for achievement of this object is constructed such that, in the above-mentioned structure, the notifying unit consists of a buzzer.

It is further an object of the present invention to provide a tripod device capable of setting a pan head easily and surely, while looking through a finder of a camera. A tripod device for achievement of this object is constructed such that, in the tripod device achieving the above first or third object, the notifying unit is connected to a display portion formed in a finder of a camera.

The above and other objects and features of the present invention will be more apparent with reference to the description of the following embodiments together with the accompanying drawings.

BRIEF DESCRIPTION OF THE PREFERRED EMBODIMENTS

An embodiment of the present invention will be described hereinafter with reference to the accompanying drawings.

Figure 1:
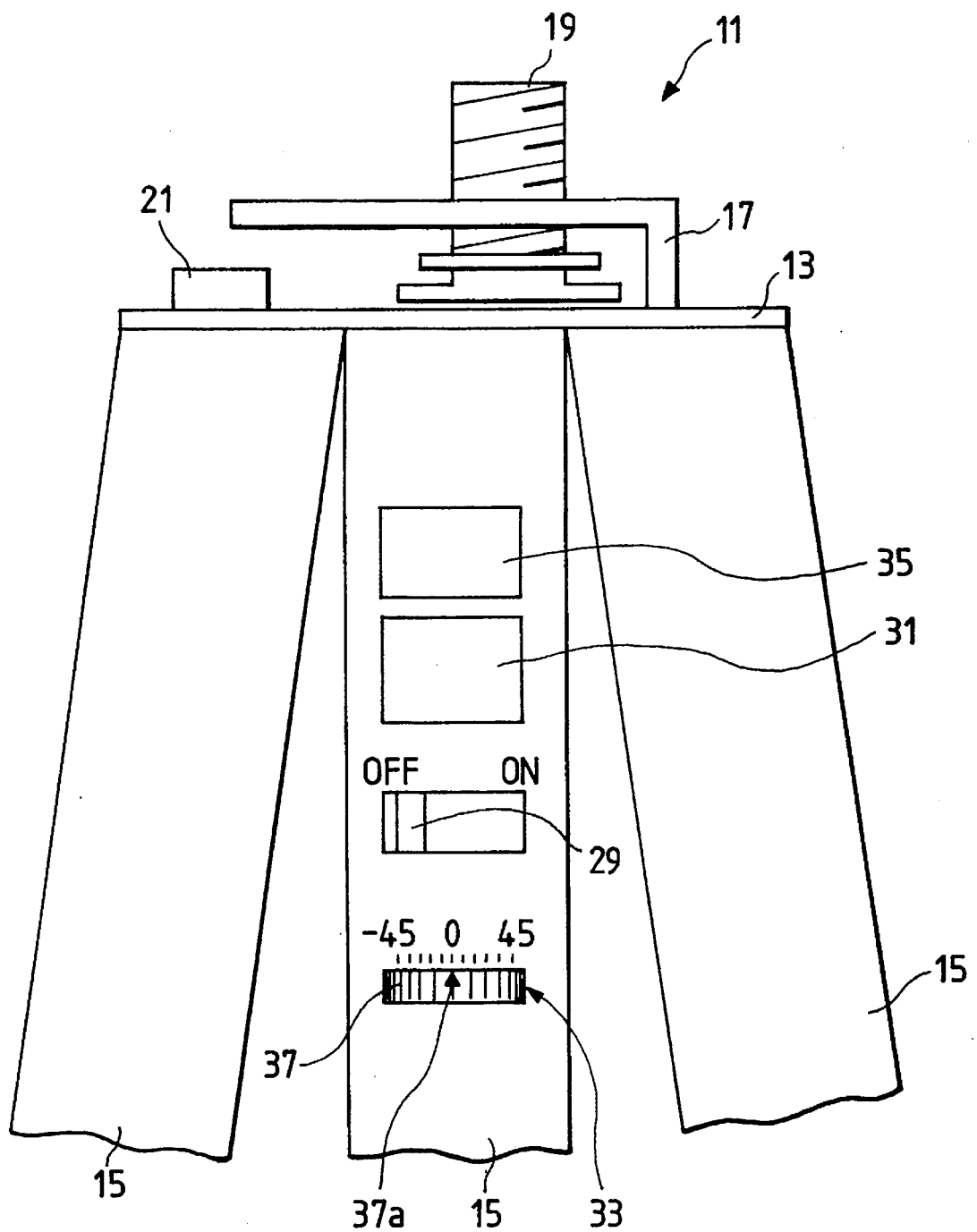
FIG. 1 is a front view showing a first embodiment of a tripod device of the present invention.

FIG. 1 shows a first embodiment of a tripod device of the present invention, and a reference numeral 11 represents a pan head.

Three legs 15 are connected spreadably to the lower portion of a base 13 of the pan head 11.

To the upper portion of the base 13 is secured an inverted L-shaped mounting member 17, to which a camera mounting screw 19 for engagement with a female screw of camera is provided.

Figure 2A:
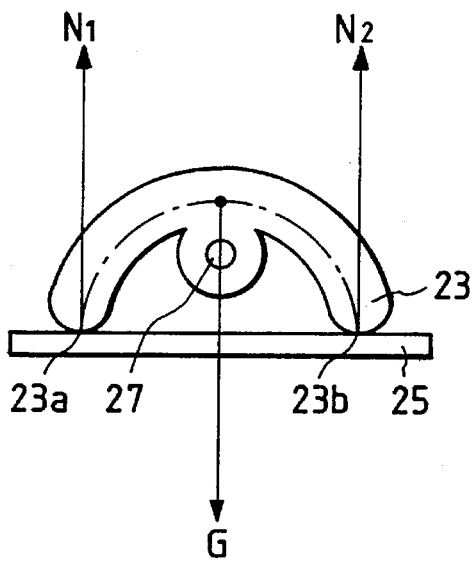
FIGS. 2A to 2C are views for explaining the angle detector of FIG. 1 in detail.
Figure 2B:
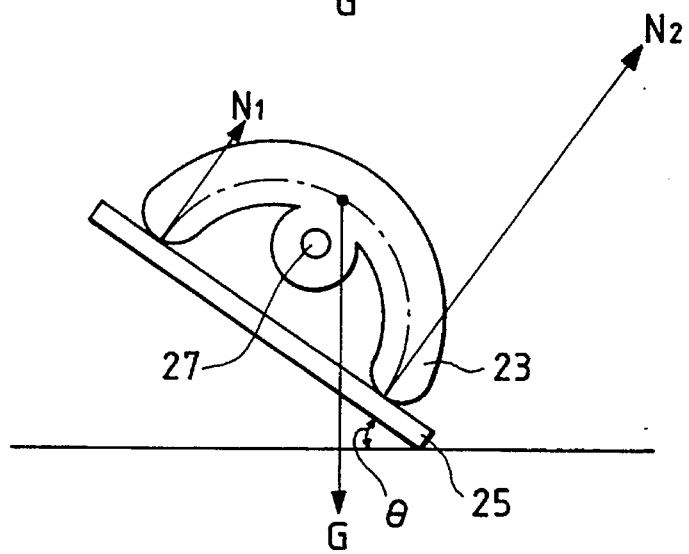
Figure 2C:
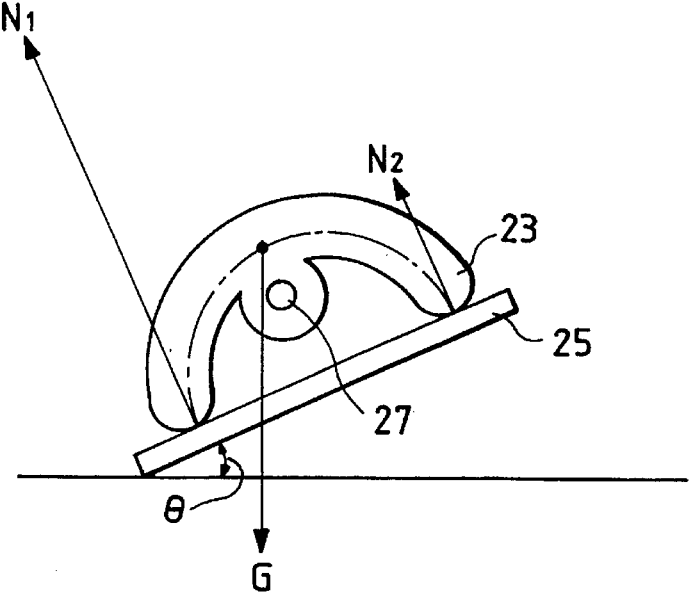

In this embodiment, an angle detector 21 for detecting the inclination of the pan head 11 is disposed on the base 13. As shown in FIGS. 2A to 2C, the angle detector 21 has an approximately semicircular gravity balancing member 23 and a pressure-sensitive sheet 25 with which both ends 23a, 23b of the gravity balancing member 23 are in contact. The gravity balancing member 23 is rotated around a pivot 27 so that right and lift balance is maintained.

Figure 3A:
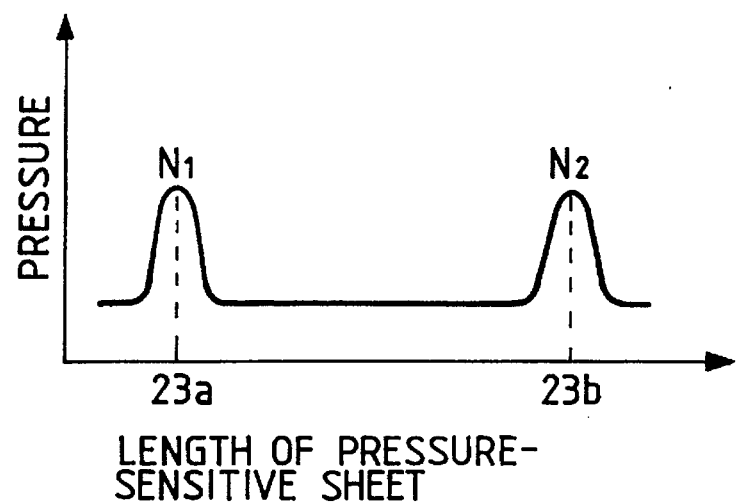
FIGS. 3A to 3C are views for explaining pressures acting on the pressure-sensitive sheet of FIGS. 2A to 2C.
Figure 3B:
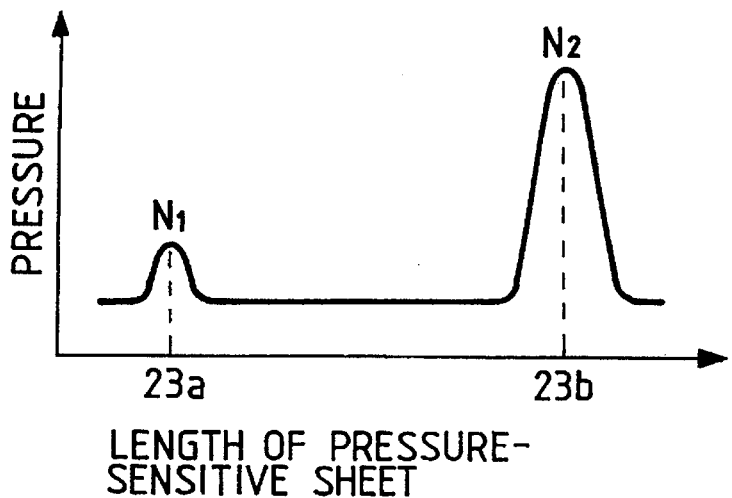
Figure 3C:
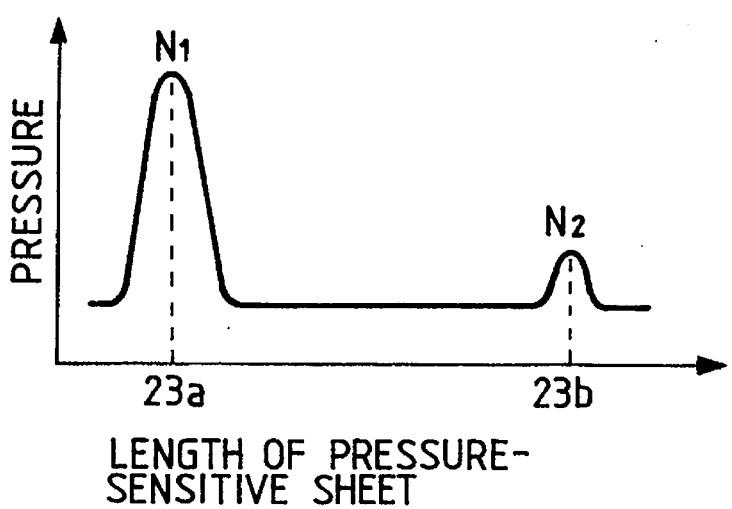

Therefore, as shown in FIG. 2A, when the pressure-sensitive sheet 25 is level, reaction forces $N_1$, $N_2$ of the gravity applied to the pressure-sensitive sheet 25 become the same. Accordingly, the pressures as shown in FIG. 3A act on the pressure-sensitive sheet 25. As shown in FIG. 2B, when the pressure-sensitive sheet 25 is inclined to the right at the angle of θ, reaction forces $N_1$, $N_2$ of the gravity applied to the pressure-sensitive sheet 25 become $N_1<N_2$. Accordingly, the pressures as shown in FIG. 3B act on the pressure-sensitive sheet 25. Further, as shown in FIG. 2C, when the pressure-sensitive sheet 25 is inclined to the left at the angle of θ, reaction forces $N_1$, $N_2$ of the gravity applied to the pressure-sensitive sheet 25 become $N_1>N_2$. Accordingly, the pressures shown in FIG. 3C act on the pressure-sensitive sheet 25. Consequently, the inclination θ of the pressure-sensitive sheet 25 can be known from the absolute values or pressure ratio of the pressures acting on the pressure-sensitive sheet 25. In the angle detector 21, an electric signal whose magnitude corresponds to the pressures acting on the pressure-sensitive sheet 25 is output. Based on the electric signal, the inclination θ is calculated.

In FIG. 1, the leg 15 is provided with a power supply switch 29, a buzzer 31 of a notifying unit, an angle setting unit 33 for setting an angle and a control unit 35 for controlling these members and units.

In the angle setting unit 33, the angle can be set by rotating a dial 37. The angle is set by making an arrow 37a marked on the dial 37 coincide with the numerical value of the angle.

Figure 4:
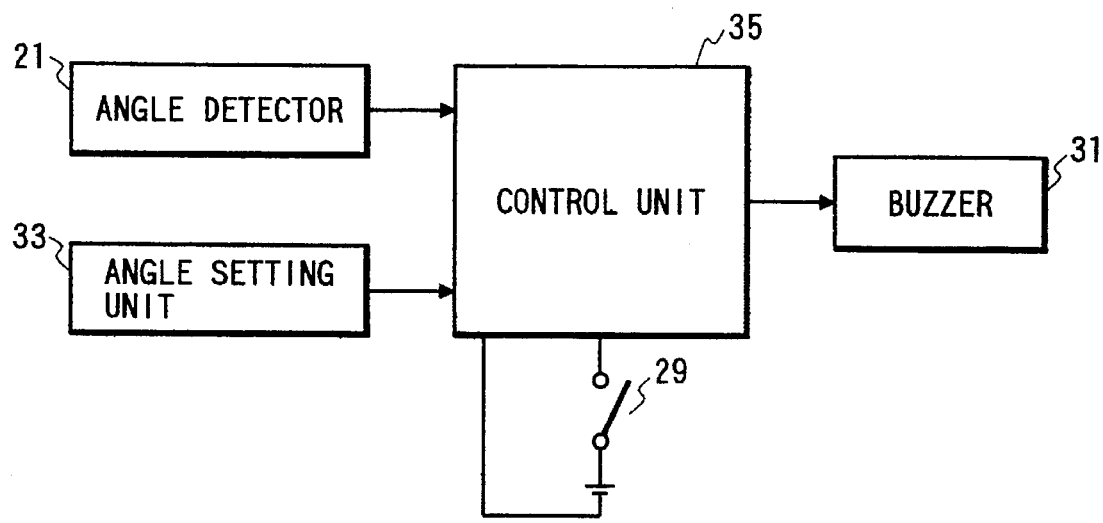
FIG. 4 is a block diagram showing the control unit of FIG. 1.

FIG. 4 is a block diagram of the control unit 35 consisting of a microcomputer. The angle detector 21, the angle setting unit 33, the power switch 29 and the buzzer 31 are connected to the control unit 35.

Figure 5:
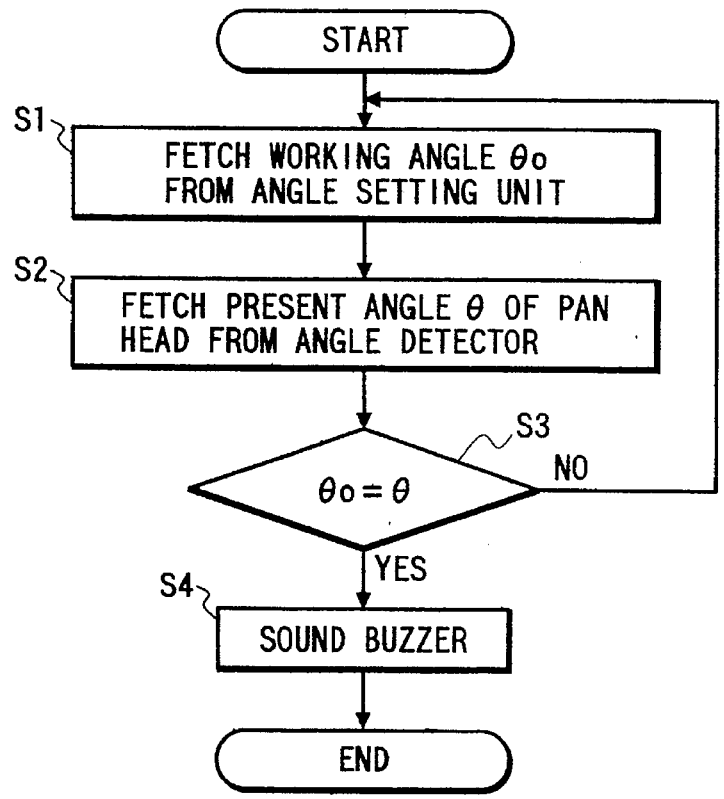
FIG. 5 is a flowchart showing the operation of the control unit.

FIG. 5 is a flowchart of the control unit 35 and this flowchart starts when the power switch 29 is turned on.

First, a working angle $θ_0$ of the pan head 11 set in the angle setting unit 33 is fetched (Step 1). Next, the present angle θ of the pan head 11 is fetched from the angle detector 21 (Step 2). Thereafter, the working angle $θ_0$ is compared with the angle θ of the pan head 11 (Step 3). When they are the same, the buzzer 31 is sounded (Step 4), notifying a user that the tripod device is set to the predetermined angle.

In the above-structured tripod device, a working angle of the pan head 11 desired by the user is set in the angle setting unit 33 beforehand. When the angle of the pan head 11 detected by the angle detector 21 reaches the set working angle, a set signal is output from the control unit 35 and the buzzer 31 is sounded to notify the user that the pan head is set at the predetermined angle. Therefore, the pan head can be set at the predetermined angle easily and surely.

Also, since the fact that the pan head is set at the predetermined angle is notified to the user by the sound of the buzzer 31, the pan head can be set easily and surely, depending on the sound.

Figure 6:
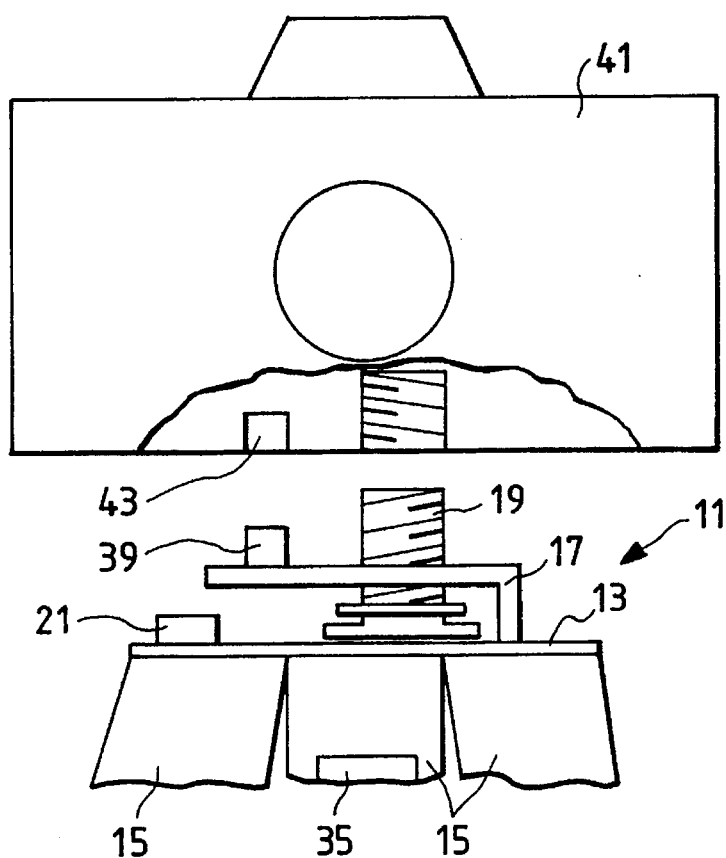
FIG. 6 is a front view showing a second embodiment of a tripod device of the present invention.
Figure 7:
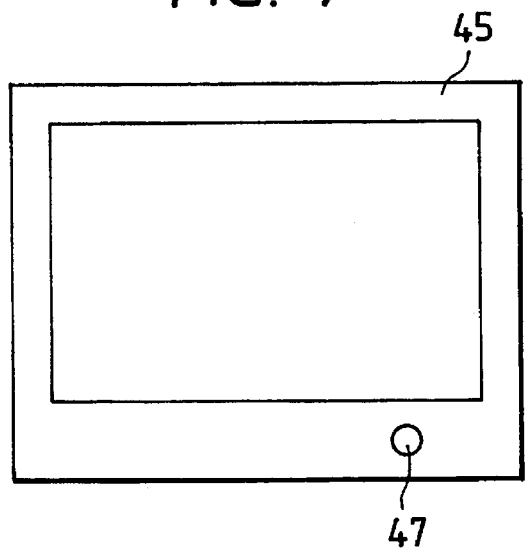
FIG. 7 is a view for explaining the finder of the camera of FIG. 6.

FIGS. 6 and 7 show a second embodiment of the tripod device of the present invention. In this embodiment, an electric contact 39 connected to the control unit 35 is provided protrusively on the mounting member 17 of the pan head 11. A camera 41 is formed with an electric contact 43 in which the electric contact 39 is fitted when mounting the pan head 11 to the camera 41.

Also, as shown in FIG. 7, a finder 45 of the camera 41 is formed with a display portion 47 consisting of a light emitting diode, a liquid crystal device or the like. When the pan head reaches a predetermined angle, the display portion 47 is lighted by the control unit 35 to notify the user that the pan head is set to the predetermined angle. Accordingly, the tripod device can be set easily and surely by looking through the finder 45 and only looking at the display portion 47.

Although the working angle is set by the angle setting unit 33 in the above embodiments, the present invention is not limited thereto. For example, the angle detector 21 may be replaced with a device in which mercury put in a capsule of glass is inclined in accordance with the angle of the pan head and thereby, electrodes attached to the capsule are made conductive, and the notifying unit may be directly operated by the input of an electric signal corresponding to the conductivity.

Also, although the fact that the pan head is set to the working angle is notified to the user by the sound of the buzzer 31 in the above embodiments, the present invention is not limited thereto, and it may be notified by light or the like.

Further, although the buzzer 31 is sounded when the pan head is set to the working angle, the present invention is not limited thereto, and at that time, a sounding buzzer may be stopped.

What is claimed is:

1. A tripod device comprising:
    an angle detector for detecting an inclination of a pan head disposed on said tripod device;
    an angle setting unit for setting a working angle of said pan head;
    a control unit for outputting a set signal when an angle of said pan head detected by said angle detector becomes said working angle set by said angle setting unit; and
    a notifying unit to be operated by said set signal from said control unit for notifying a user that said pan head of said tripod device is set at said working angle.

2. A tripod device according to claim 1, wherein said notifying unit is constituted of a buzzer.

3. A tripod device according to claim 1, wherein said notifying unit has a connecting portion to be connected to a display portion formed in a finder of a camera.

4. A tripod device comprising:
    an angle detector disposed on said tripod device for detecting, when a pan head is inclined at a predetermined angle, said predetermined angle, and outputting a predetermined angle signal; and
    a notifying unit to be operated by said predetermined angle signal from said angle detector for notifying a user that said pan head is inclined at said predetermined angle.

5. A tripod device according to claim 4, wherein said notifying unit is constituted of a buzzer.

6. A tripod device according to claim 4, wherein said notifying unit has a connecting portion to be connected to a display portion formed in a finder of a camera.

* * * * *